United States Patent [19]

Schenk et al.

[11] Patent Number: 5,024,298

[45] Date of Patent: Jun. 18, 1991

[54] APPARATUS AND METHOD OF AUTOMOTIVE BRAKE WITH BOOSTER PISTON

[75] Inventors: Donald E. Schenk, Vandalia; Edward J. DeHoff, Huber Heights; Schuyler S. Shaw, Dayton, all of Ohio

[73] Assignee: General Motors Corporation, Detroit, Mich.

[21] Appl. No.: 353,040

[22] Filed: May 17, 1989

[51] Int. Cl.$^5$ ............................................. F16D 55/14
[52] U.S. Cl. ................................ 188/72.2; 188/72.5; 188/346
[58] Field of Search .................... 188/71.4, 72.2, 72.5, 188/72.4, 72.6, 346

[56] References Cited

U.S. PATENT DOCUMENTS

| | | | |
|---|---|---|---|
| 3,173,517 | 3/1965 | Powlas | 188/72.2 |
| 3,335,821 | 8/1967 | Shew | 188/72.2 |
| 3,750,857 | 8/1973 | Marschall et al. | 188/72.5 |
| 3,897,858 | 8/1975 | Toshida et al. | 188/72.5 |
| 4,505,363 | 3/1985 | Herbulot et al. | 188/72.5 |
| 4,685,541 | 8/1987 | Price et al. | 188/71.4 |
| 4,795,003 | 1/1989 | Colgate | 188/71.4 |

FOREIGN PATENT DOCUMENTS

| | | | |
|---|---|---|---|
| 1655298 | 1/1971 | Fed. Rep. of Germany | 188/72.5 |
| 0031868 | 3/1979 | Japan | 188/72.2 |

Primary Examiner—Matthew C. Graham
Attorney, Agent, or Firm—Ernest E. Helms

[57] ABSTRACT

A vehicle wheel braking system activated by a master cylinder is provided including a rotor connected to a vehicle wheel, a bracket having a position fixed with respect to the rotor, and a caliper slidably mounted with respect to the bracket in a plane generally perpendicular to the rotor rotational axis. A first hydraulic cylinder activated by the master cylinder is connected with the caliper. The first hydraulic cylinder has a piston for frictionally engaging the rotor to retrain rotation thereof. A second hydraulic cylinder is positioned between the caliper and the bracket. The second hydraulic cylinder has a piston that is pressurized by a reaction force experienced between the caliper and the bracket when the first hydraulic cylinder is activated. A third hydraulic cylinder is fluidly connected with the second hydraulic cylinder to receive pressure therefrom. The third hydraulic cylinder has a piston to frictionally engage the rotor to retrain rotation thereof.

16 Claims, 5 Drawing Sheets

APPARATUS AND METHOD OF AUTOMOTIVE BRAKE WITH BOOSTER PISTON

FIELD OF THE INVENTION

The field of the present invention is that of disc type automotive vehicle brakes and methods of utilization thereof.

DISCLOSURE STATEMENT

It is know in the art to provide disc type brakes for automotive vehicles. The type disc brake includes a rotor which is fixably attached to the wheel. Connected to the vehicle in a non-rotative manner is a bracket which holds a caliper. The caliper has a hydraulic cylinder which is activated to force the piston against the rotor frictionally engaging the same to restrain movement thereof. An excellent example of a disc type automotive vehicle brake can be found in commonly assigned U.S. Pat. No. 4,446,948. To meet ever more stringent requirements regarding the fuel economy of vehicles, it is a constant quest to provide automotive components which provide the same functions while decreasing the overall weight of the vehicle.

SUMMARY OF THE INVENTION

The present invention provides a disc type automotive vehicle brake and an alternative to the type described in the above-noted patent. The present invention provides an apparatus and method of utilization thereof of a disc type brake which uses the reaction force between the disc brake caliper and rotor to pressurize an auxiliary booster piston which adds to the braking capacity of the braking system. In its preferred embodiment, the present invention provides a stabilization valve which enables the self-energization to be linear with respect to the pressure delivered to the main caliper by the master cylinder.

It is an object of the present invention to provide a self-energizing disc type automotive vehicle brake apparatus and a method of utilization thereof.

Other objects and advantages of the present invention can become more apparent to those skilled in the art as the nature of the invention is better understood from the accompanying drawings and a detailed description.

DETAILED DESCRIPTION OF THE DRAWINGS

Figure 1:
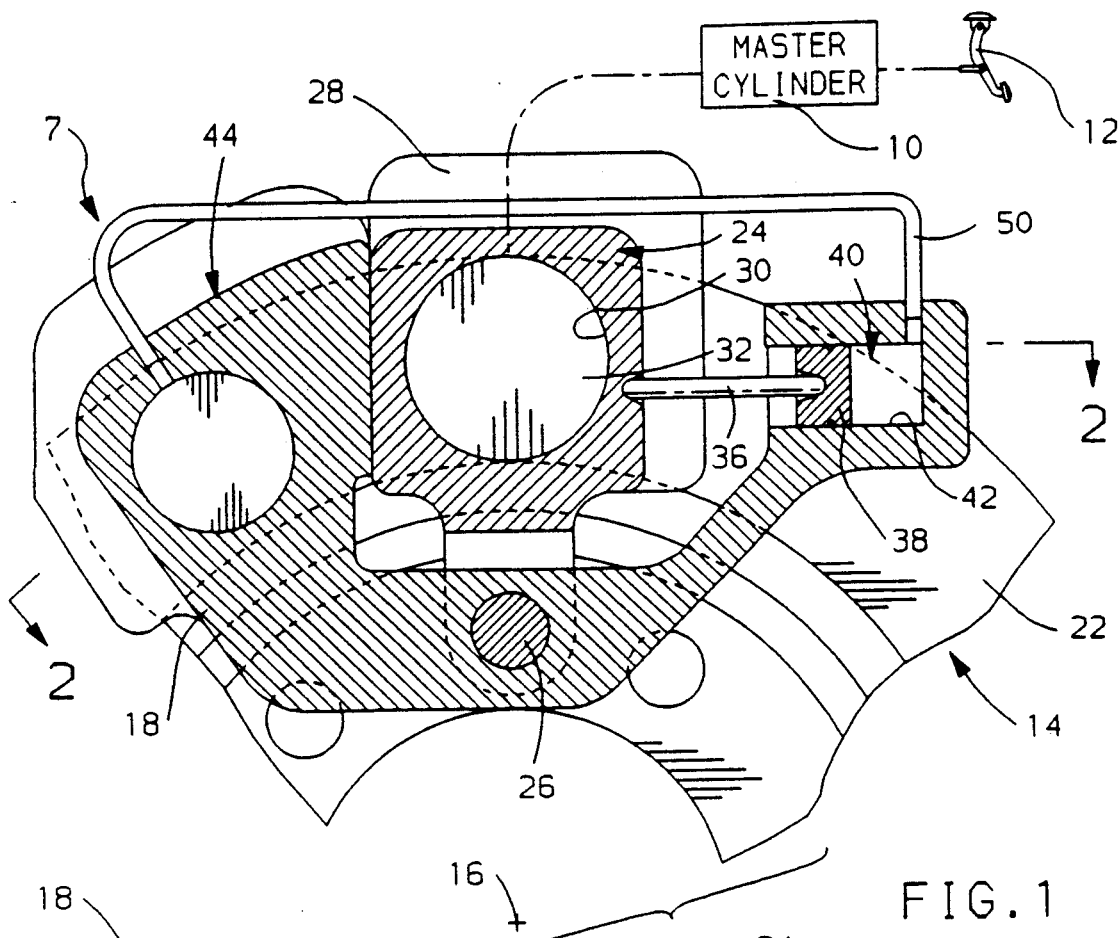
FIG. 1 is a view taken along line 1—1 of FIG. 2.
Figure 2:
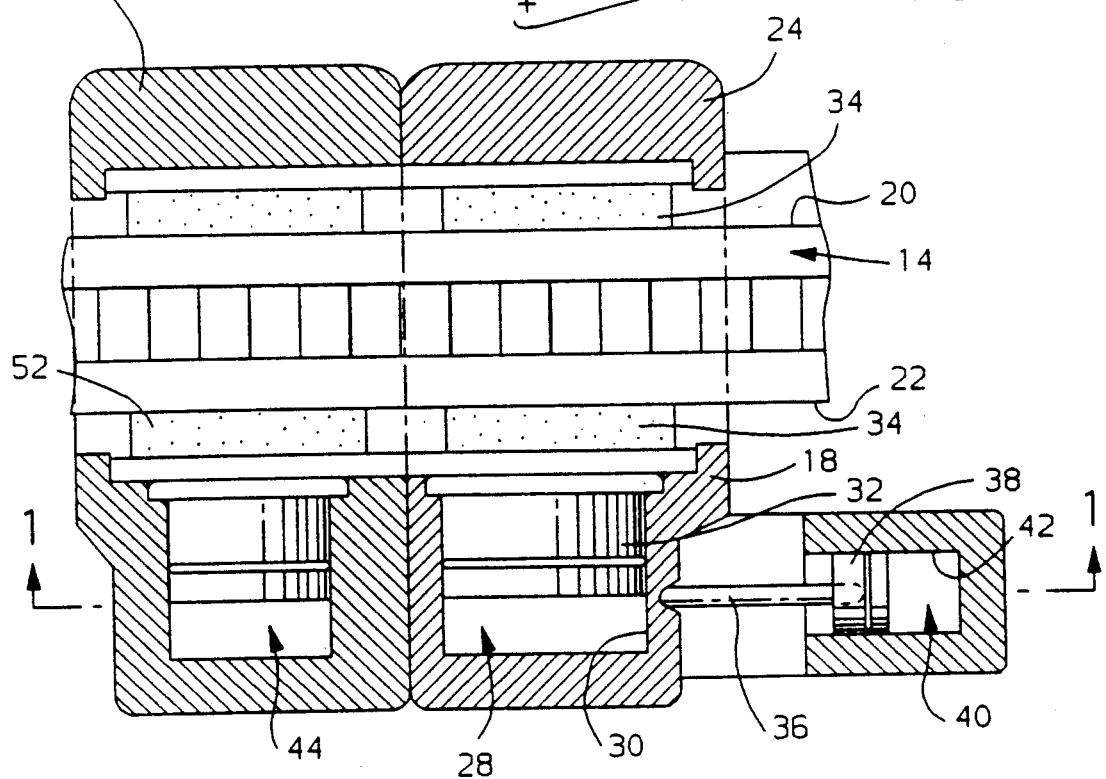
FIG. 2 is a view taken along line 2—2 of FIG. 1.

Referring to FIG. 1, the braking system 7 of the present invention is activated by a conventional master cylinder 10 which is in turn operated by a foot pedal 12 in a conventional manner. Fixably attached to the wheel (not shown) of the vehicle is a disc rotor 14. The rotor has a rotational axis 16. Connected with the vehicle and having a position generally fixed with respect to the rotational axis 16 of the rotor 14 is a bracket 18.

The rotor disc has two sides 20, 22 which provide frictional engaging surfaces. A caliper 24 is slidably mounted to the bracket along a plane generally perpendicular to axis 16 via a pivotal connecting pin 26. In the embodiment shown, the caliper 24 has relative sliding movement perpendicular to the plane of the rotor 14 (parallel to axis 16) since it is a dual acting brake caliper. However, the caliper 24 also has relative movement along the plane of the rotor 24 with respect to the bracket 18. Connected with the caliper is the first hydraulic cylinder means 28. The first hydraulic cylinder means 28 includes a bore 30 within the caliper 24 with a slidably mounted caliper piston 32. This design can be of a conventional nature, and the caliper piston carries with it a brake shoe 34 which provides the lining which makes engagement with the rotor. Typically, the caliper will be a "C" clamp shape, therefore, activation of the first hydraulic cylinder will cause the piston to engage the rotor and to push the caliper piston 32 inward and causing an outboard shoe 34 to come in contact with the rotor surface 20, thereby providing braking on both sides of the rotor in a conventional manner. However, as previously mentioned, the caliper shown is also pivotally connected with the bracket 18. Therefore, the activation of the first hydraulic cylinder 28 by the caliper 24 causes the master cylinder 10 to be urged, as shown, to the right forcing a plunger 36 in the same direction. The plunger 36 makes contact with a piston 38 of a second hydraulic cylinder means 40. In the embodiment shown, the second hydraulic cylinder means 40 (sometimes referred to as the booster or reaction cylinder) has a bore 42 in the bracket 18 with the piston 38 slidably mounted therein. However, an alternative embodiment to be explained later the bore 42 can be in the caliper and the piston can abut against the bracket.

Figure 8:
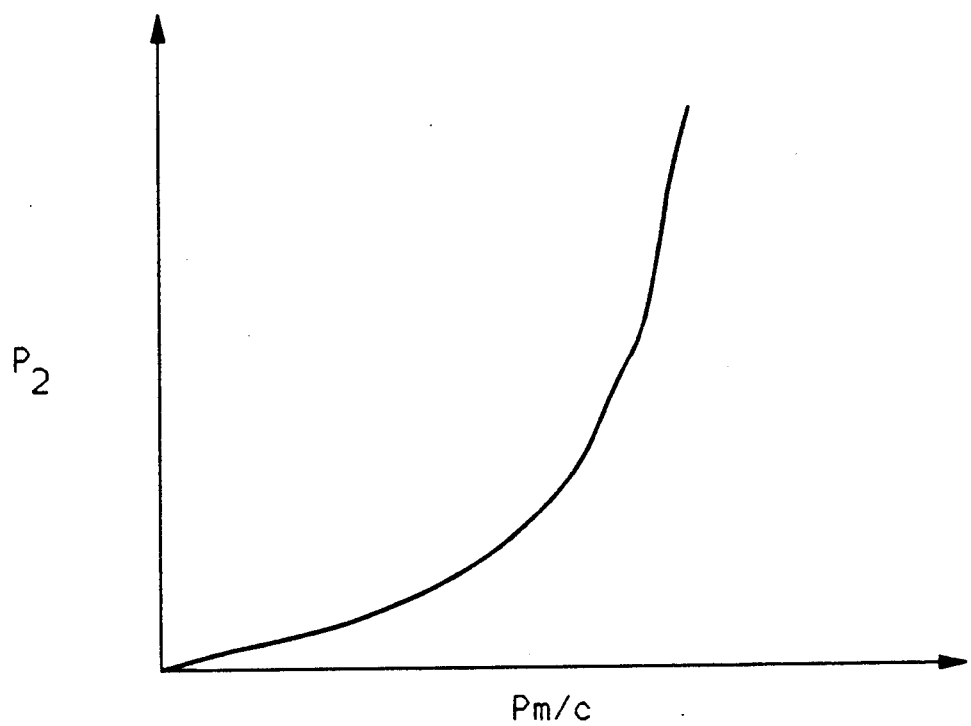
FIG. 8 is an output pressure versus master cylinder pressure diagram of an unstablized output.

The second hydraulic cylinder 40, when pressurized by the reaction force between the caliper 24 and the bracket 18, will cause a hydraulic pressure to be delivered to a third or auxiliary hydraulic cylinder means 44 via line 50. The third hydraulic cylinder 44 has a shoe 52 which may slide perpendicular to the rotor with respect to the bracket, but other than movement allowed by the clearances is fixed with respect to the bracket 18 in a plane parallel to the rotor 14. If the output of the second cylinder is not stabilized, the pressure feed to the third cylinder will go up in a nonstable manner, almost logarithmically when the first cylinder 28 is applied as shown in FIG. 8.

Figure 3:
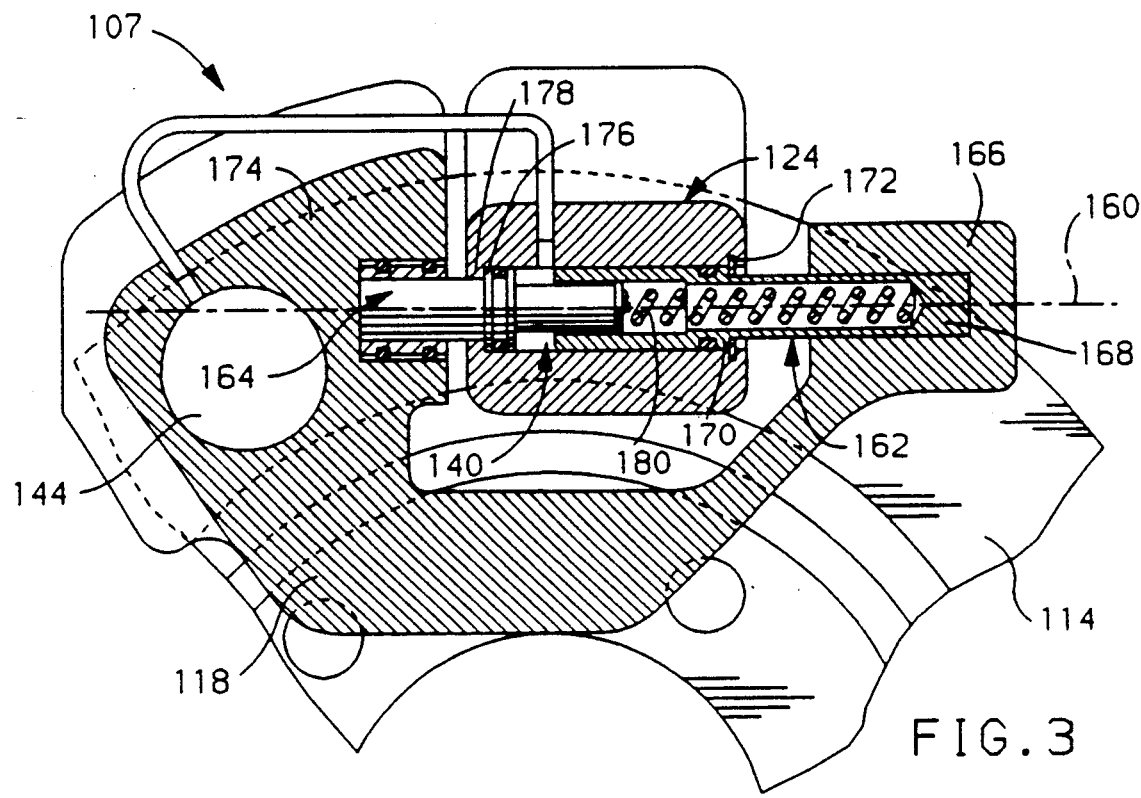
FIG. 3 is a side elevational view partially sectioned of an alternative embodiment braking system according to present invention.
Figure 4:
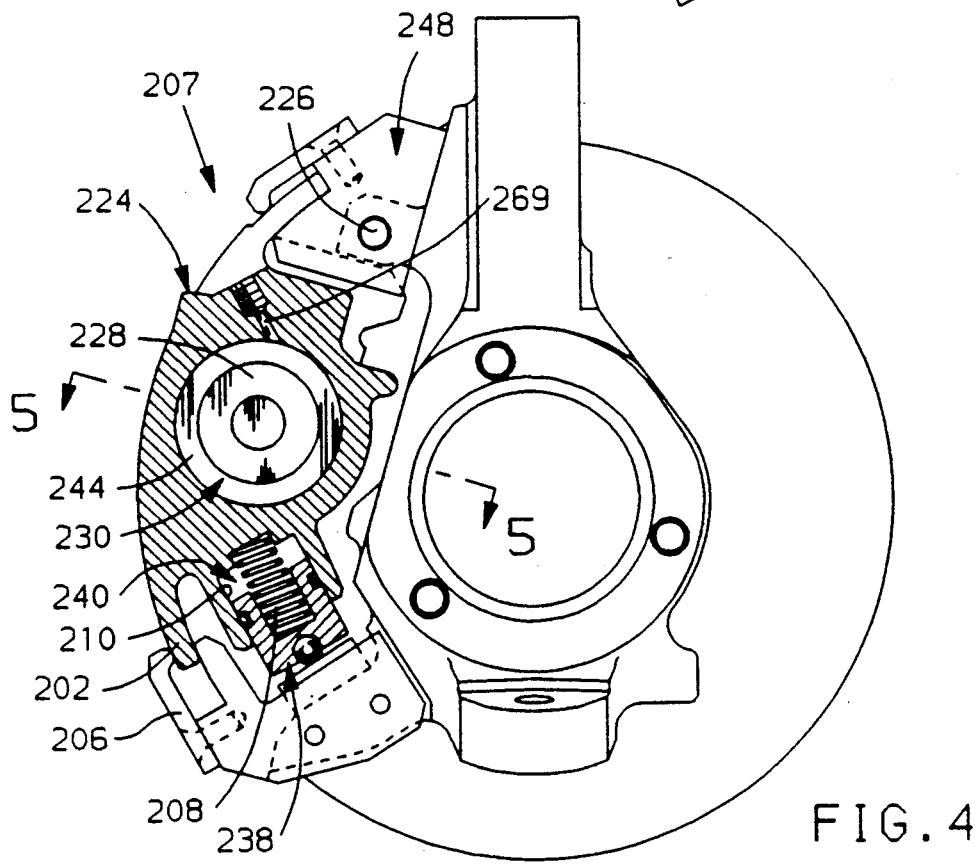
FIG. 4 is a front elevational view partially sectioned of an alternative preferred embodiment of the present invention.
Figure 5:
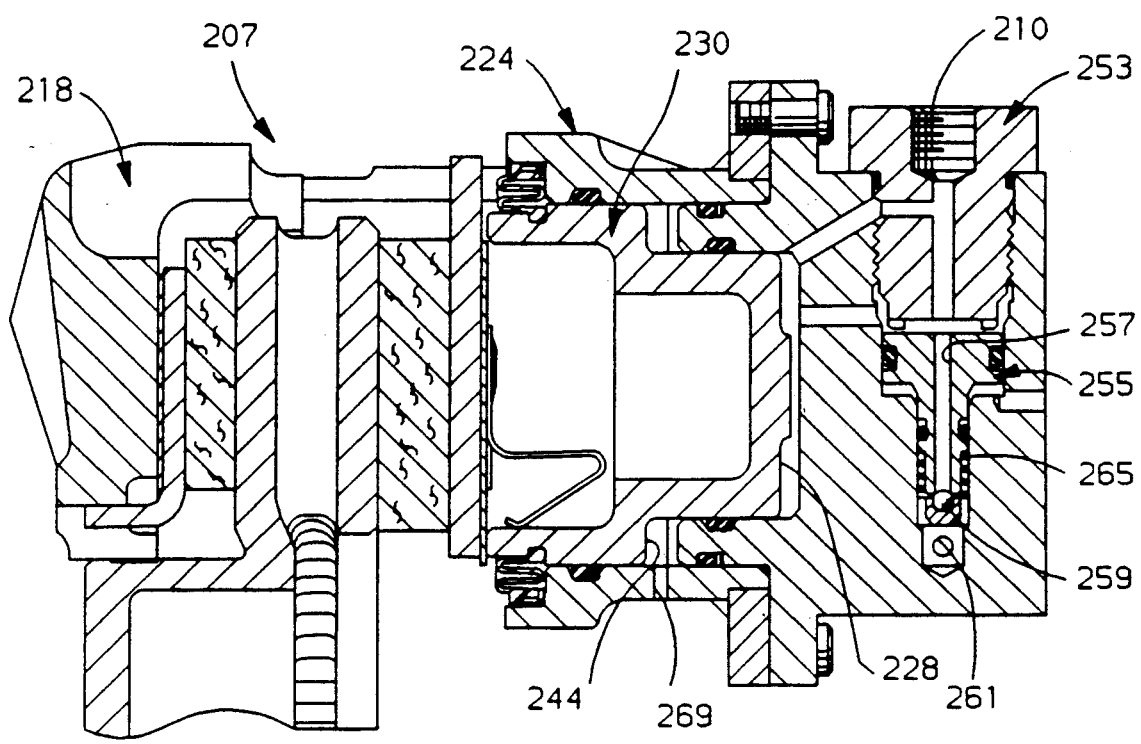
FIG. 5 is an enlarged view of the embodiment of FIG. 4 taken along line 5—5 of FIG. 4 with portions shown out of position for clarity of illustration.
Figure 6:
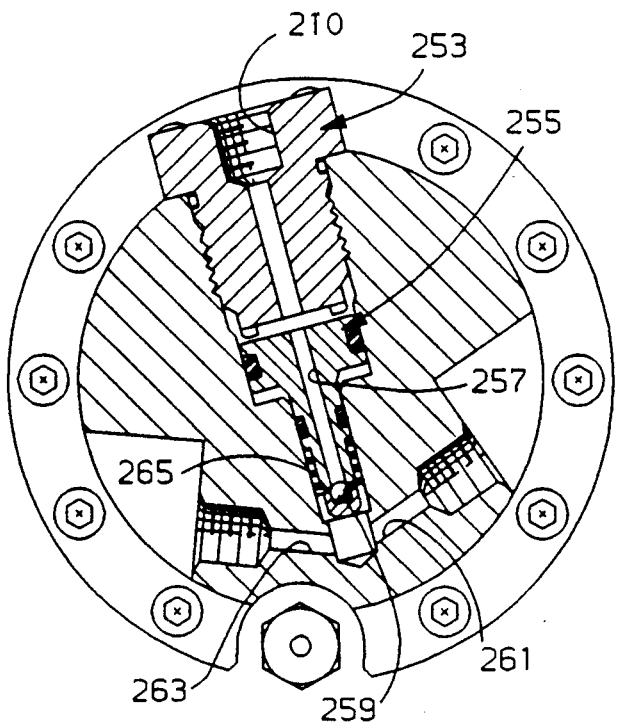
FIG. 6 is a sectional view of a compensation valve.

Referring additionally to FIG. 3, an alternative embodiment 107 of the present invention is provided. The first cylinder of the caliper 124 is like that previously described. In the alternative version, instead of being pivotally connected with respect to the bracket 118, the caliper 124 is slidably mounted along a line 160 generally parallel with the plane of the rotor 114 forming an arc with respect to the rotor 114. Suspending the brake caliper is a second hydraulic cylinder means provided by a sleeve 162 which receives a reciprocally mounted plunger 164. The sleeve 162 has a closed end 168 for making contact with an ear 166 of the bracket. The bracket ear 166 has an oblong aperture in a direction perpendicular to the rotor to allow the sleeve to travel therein. The sleeve 162 has a flange 170 which engages with a snap ring 172 within the caliper frame limiting its respective movement with respect thereto in the right hand direction as shown in FIG. 3. In like manner, the plunger is fixed within an oblong aperture of the opposite caliper ear 174, and has a flange 176 preventing its total separation from the caliper in the left direction. The advantage of this configuration is that the caliper travels in a straight line when engaging the brake after being activated by the master cylinder and not along the arc, therefore, the caliper will experience induced radial sliding movement with respect to the rotor 114 when engaging the brake 107. Also, the secondary cylinder 140 will be activated when the brake 107 is applied in either the forward or rearward direction. In forward direction the sleeve 162 will contact the ear 166 of the bracket to the right and the plunger 164 being held by the caliper flange 178 to the right will be compressed against a biasing spring 180 to pressurize the chamber between the plunger and the sleeve member. This pressure will be fed to the auxiliary piston 144. If the brake 107 is applied with the rotor rotations in an opposite direction the sleeve 162 will be held from moving to the left and the plunder, making contact, will react to the right against the biasing spring 180 again pressurizing the second cylinder 140.

Referring additionally to FIGS. 4-7, an alternative preferred embodiment 207 braking system of the present invention is provided. The first cylinder means of the present is activated by the master cylinder as before described. However, it acts upon a two step piston 230 which has two outside diameters sealed within concentric bores of the caliper 224. The pressure delivered from the master cylinder only acts upon the first inner concentric area 228 (the fluid pressure areas of the piston 230 are concentric as a matter of simplicity of design but need not be in another application). The third hydraulic cylinder means is provided by the outer diameter second area which is exposed to the pressure originally generated by a second cylinder means.

The caliper 224 is pivotally connected with respect to the bracket 218 along one end by a pin 226. The caliper 224 also has a guide boss 202 fitting within a curved alignment fork 206 arrangement of the bracket 218 along the other end. Slidably mounted into a bore 210 of the caliper 224 and biased outward by a spring 208 is the secondary piston 238 which abuts against the bracket. Activation of the brake 207 causes the caliper 224 to rotate with respect to the bracket 218 causing the secondary piston 238 to be compressed within the secondary cylinder 240. The pressure from the secondary cylinder is fed to a stabilization valve 407, whose function will later be described, before being fed to the third cylinder means or the outer second diameter 244 area of the caliper piston 230 (via inlet 269).

Fluidly joining the outer diameter area 244 of the caliper piston 230, the master cylinder (via an inlet 210) and the secondary cylinder 240 is a compensation valve 253. The compensation valve 253 has as previously mentioned a master cylinder inlet 210 and a "T" 255 section with a central bore 257 which is impinging upon a valve ball 259 closing off the same. The underside of the "T" 255 is vented to the atmosphere. When pressure is existing upon the master cylinder, the "T" is forced downward closing off access from the master cylinder to the secondary cylinder 240 of the caliper (via inlet 261) and to the second piston area (via outlet 263). However, in the absence of pressure in the master cylinder, the spring 265 biasing of the "T" 255 section forces it upward allowing the secondary cylinder 240 and the second area 244 to be exposed to the master cylinder. The first piston area 228 is already exposed to the master cylinder. The above is important since in a non-activated state, vibration or heat build-up in the brake 207 could inadvertently cause expansion of fluid in one of the cylinders causing the brake 207 to actuate. The above is typically experienced by virtue of a heat build-up in the secondary cylinder 240 causing the second area 244 to experience a pressure output.

Figure 7:
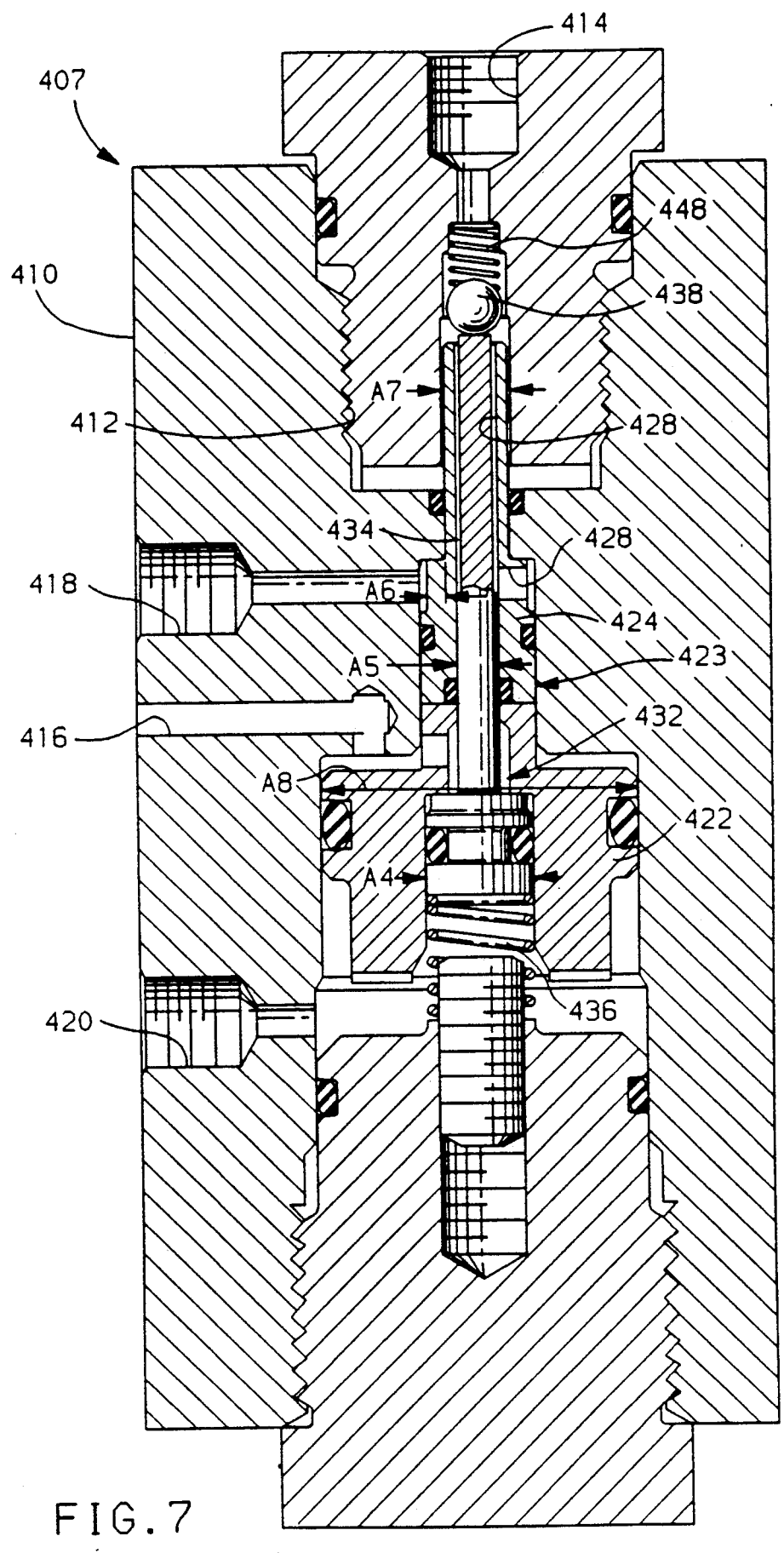
FIG. 7 is a sectional view of a stabilization valve.
Figure 9:
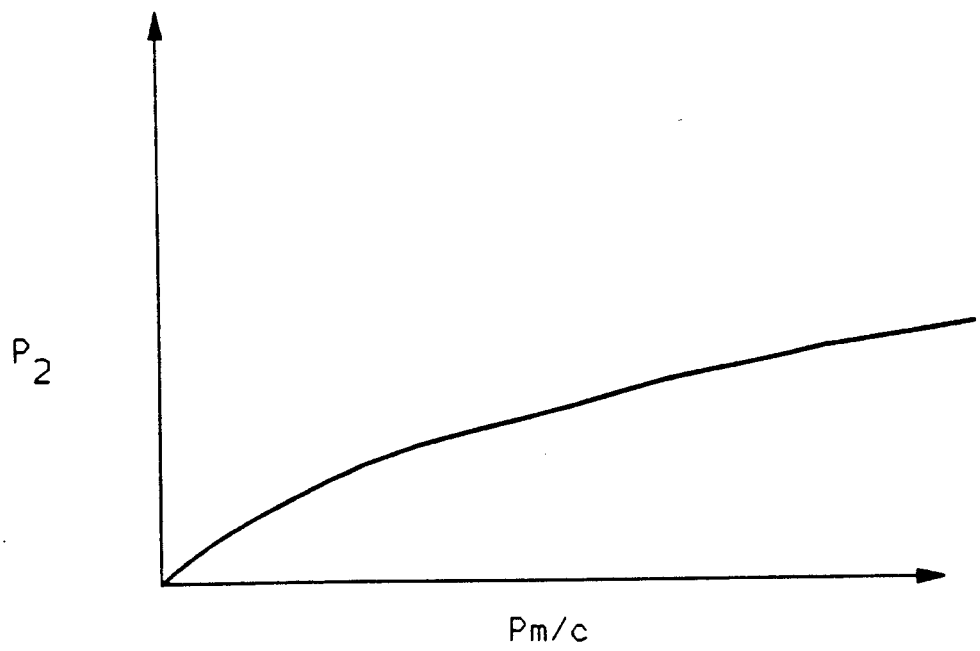
FIG. 9 is a stabilized output versus master cylinder output pressure curve.

As mentioned previously, to get a generally linear ratio between the pressure felt in the second area 244 with respect to the pressure fed to the first area 228 by the master cylinder (as shown in FIG. 9), there is provided a stabilization valve, as illustrated in FIG. 7. The stabilization valve 407 has a frame 410 with a multi-diameter longitudinal bore 412. The bore, on one end, has a fluid connection for the master cylinder 420. The bore 412 also has a vent 416 to the atmosphere, an outlet 418 to the second area 244 or third cylinder means via a passage 269 (FIG. 5), and an inlet 414 from the second cylinder 240. Although, shown in two pieces, for purposes of manufacturing, slidably mounted within the bore is first valve spool means 423 comprised of parts 422 and 424. The first valve spool 423 has a multi-outside diameter configuration, three of the outside diameter being sealed therein the bore 412. The first valve spool 423 also has a passage 428 allowing fluid flow from the second cylinder to the second area. Slidably and sealably mounted within an interior bore 430 of the first valve spool 423 is a second valve spool means 423 sealed along two of its multiple outside diameters. The second valve spool 432 has a reduced outer diameter section 434 cooperating with the first valve spool to provide the passage 428 from the connection 414 means to the outlet 418. The second valve spool is biased upward by a spring 436 to an extreme position, wherein it lifts a valve ball 438 away from the opening provided by the interior bore 430 bore of the first valve spool 423. The ball 438 is also typically biased downward by a spring 448 away from the connection 414 provided for the second hydraulic cylinder means.

To control the gain of the self-energizing output, the stabilization valve 407 lowers the pressure delivered to the second area. The device shown shows a second valve spool area A4 which is acted on by master cylinder pressure. Piston area A5 is acted on by boost pressure (from the boost cylinder). At the desired maximum gain value of the caliper, the corresponding boost pressure may want to exceed the desired boost/master cylinder pressure ratio, which will cause the second valve spool to stroke such that the ball valve 438 will close the passage 428 between the boost piston to the outlet 418. The above will limit the gain of the caliper assembly. To maintain the desired gain, the pressure to outlet 418 must be stabilized when the inlet 414 is closed off. The above is done by adjusting the volume or displacement of the fluid acting upon the second area (via outlet 418). Concentric area A6 can move to increase this volume. Area A6 and A7 sees generated boost pressure which is compared to area A8 which sees master cylinder pressure. If the pressure on area A6 and A7 exceeds that of the predetermined boost/master cylinder pressure gain ration, the first spool 423 piston moves to increase the second area fluid volume which decreases torque output from the caliper 224, which decrease pressure delivered by the cylinder 240. With the boost pressure decreased, the master cylinder pressure acting on A8 forces the first spool 423 to its original position. If the boost pressure decreases below the desired boost/master cylinder pressure ratio, the second spool 432 moves to open the ball valve 438. This allows the boost pressures to increase on the second area 244. This repeated cycling stabilizes the maximum torque output of the caliper 224 for a given constant master cylinder pressure input. Therefore, when the pressure delivered by the second cylinder 240 is lower, then a first multiple of the pressure delivered by the master cylinder, there will be free flow between the second cylinder means and the third cylinder means. Flow will be prevented when the pressure delivered by the second cylinder exceeds the pressure delivered by the master cylinder by second multiple multiple higher than the first multiple, and fluid will be displaced in the third cylinder means when the pressure delivered by the second cylinder exceeds the pressure delivered by the master cylinder by third multiple higher than the second multiple.

When a few of the embodiments of the present invention have been explained it will be readily apparent to those skilled in the art of the various modifications which can be made to the present invention without departing from the spirit and scope of this application as it is encompass by the following claims.

The embodiments of the invention in which an exclusive property or privilege is claimed are defined as follows:

1. A vehicle wheel braking system activated by a master cylinder comprising:
   a rotor fixably connected to said vehicle wheel, said rotor having a rotational axis;
   a bracket having a position generally fixed with respect to said rotor rotational axis;
   a caliper slidably mounted with respect to said bracket in a plane generally perpendicular to said rotor rotational axis;
   first hydraulic cylinder means activated by pressure delivered by said master cylinder connected with said caliper, said first hydraulic cylinder means having a piston for frictionally engaging said rotor to retrain rotation thereof;
   second hydraulic cylinder means positioned between said caliper and said bracket, said second hydraulic cylinder means having a piston being pressurized by a reaction force experienced between said caliper and said bracket when said first hydraulic cylinder means is activated;
   third hydraulic cylinder means fluidly connected with said second hydraulic cylinder means to receive pressure therefrom, said third hydraulic cylinder means having a piston to frictionally engage said rotor to restrain rotation thereof.

2. A vehicle braking system as described in claim 1 wherein said second hydraulic cylinder means has a piston slidably mounted in a bore located within said caliper.

3. An apparatus as described in claim 1 wherein said second hydraulic cylinder means comprises a sleeve fixed within a bore of said caliper having one end for contact with said bracket, and a plunger reciprocally received into said sleeve having an end for said bracket on the side of said caliper opposite said sleeve, said sleeve and bracket mounting said caliper to said bracket such that said caliper moves along a generally straight line with respect to said bracket when first hydraulic cylinder means is activated.

4. A braking system as described in claim 1 wherein said caliper slides along a line generally straight and parallel to the plane of rotation of said rotor when said first hydraulic cylinder means is activated by said rotor.

5. A braking system as described in claim 1 wherein said third hydraulic cylinder means has a bore located within said bracket.

6. A braking system as described in claim 1 wherein said caliper is a sliding type dual action caliper which slides generally parallel to the rotational axis of said rotor.

7. A braking system as described in claim 1 wherein said second and third hydraulic cylinder means are fluidly connected with said master cylinder when said master cylinder is non-activated.

8. A braking system as described in claim 1 further including a stabilization valve between said second hydraulic cylinder means and said third hydraulic cylinder means causing the pressure delivered to said third hydraulic cylinder means from said second hydraulic cylinder means to be proportional to the pressure delivered by said master cylinder to said first hydraulic cylinder means.

9. A braking system as described in claim 1 wherein said first and third hydraulic cylinder means act on a stepped piston slidably mounted within a dual outer diameter bore located within said caliper.

10. A method of braking an automotive vehicle wheel comprising:
    fixably connecting to said vehicle wheel a bracket fixed with respect to the rotational axis of said rotor;
    mounting for relative movement in a plane generally perpendicular to the rotational axis of said rotor with respect to said bracket a caliper with respect to said bracket;
    frictionally engaging said rotor with a piston which is part of a first hydraulic cylinder means connected with said caliper and activated by a master cylinder to restrain rotation of said rotor;
    pressurizing a second hydraulic cylinder means positioned between said caliper and said bracket by the reaction force experienced between said caliper and said bracket when said first cylinder means is activated; and
    frictionally engaging said rotor to restrain rotation thereof by a third hydraulic cylinder means fluidly connected with said second hydraulic cylinder means to receive pressure therefrom.

11. A method as described in claim 10 further including stabilizing the pressure gained of said third hydraulic cylinder means by modulating the pressure of said third hydraulic means to be generally linear relationship with respect to the pressure delivered by said master cylinder to said first hydraulic cylinder means.

12. A vehicle wheel braking system activated by a master cylinder comprising:
    a rotor fixably connected to said vehicle wheel with a rotational axis;
    a bracket having a position generally fixed with respect to said rotor rotational axis and having a two spaced ears with apertures generally aligned with one another;

a sleeve mounted into one of said bracket ears having an opening projecting towards the other said bracket ear;

a plunger reciprocally mounted into said sleeve having an end received into the aperture of the ear opposite said ear of said sleeve is mounted into;

a caliper mounted by said sleeve in said plunger along an arc with respect to said rotor and being generally perpendicular with respect to the rotational axis of said rotor;

said caliper sealably surrounding said sleeve and plunger forming a second hydraulic cylinder means therewith; and said caliper having a first hydraulic cylinder means activated by pressure delivered by said master cylinder and having a piston slidably mounted within said first hydraulic cylinder for frictionally engaging said rotor to restrain rotation thereof; and third hydraulic cylinder means fixably connected with said bracket having a piston to frictionally engage said rotor to restrain rotation thereof and being fluidly connected with said second cylinder hydraulic means to receive pressure therefrom and to be activated thereby.

13. A vehicle wheel braking system activated by a master cylinder comprising:

a rotor fixably connected with said vehicle wheel;

a bracket having a position generally fixed with respect to the rotational axis of said rotor;

a caliper mounted for relative motion with respect to said bracket;

a first and third hydraulic cylinder means having a two step piston fitted within a dual diameter bore with first and second areas, said piston being for frictionally engaging said rotor to retain rotation thereof, and said master cylinder activating said first area of said piston bore;

a booster second hydraulic cylinder means with a bore located on said caliper with a piston abutting said bracket, said booster second hydraulic cylinder means being pressurized by the reaction force experienced between said caliper and said bracket when said first piston is activated by said master cylinder causing said booster second hydraulic cylinder means to deliver pressure to said two step piston second area to pressurize said third hydraulic cylinder means to aid said two-step piston in its frictional engagement with said rotor to restrain rotation of said wheel; and a compensation valve allowing said second area and said booster second cylinder means to be fluidly connected with said master cylinder when said master cylinder is non-activated.

14. A vehicle wheel braking system as described in claim 13 further including a stabilization valve for modulating the pressure within said two step piston second area to a ratio of the pressure delivered by said master cylinder to said two step piston first area.

15. In a vehicle braking system having a bracket connected to said vehicle and a rotor fixed to a vehicle wheel, and a first hydraulic cylinder means located in a caliper relatively mounted to said bracket and said first hydraulic cylinder means being activated by a master cylinder to restrain rotation of said rotor, a second hydraulic cylinder means, activated by the reaction between said caliper in said bracket, and a third hydraulic cylinder means activated by pressure from said secondary hydraulic cylinder means to restrain said rotor, a method of providing pressure to said third hydraulic cylinder means at a generally linear ratio of the pressure delivered to said first hydraulic cylinder means by said master cylinder said method comprising:

allowing free-flow between said second hydraulic cylinder means and said third hydraulic cylinder means so long as pressure delivered by said second hydraulic cylinder means is lower than a fixed multiple of the pressure delivered by said master cylinder;

preventing flow from said second hydraulic cylinder means to said third hydraulic cylinder means when the pressure delivered by said second hydraulic cylinder means exceeds the pressure delivered by said master cylinder by a second multiple higher than said first multiple; and displacing fluid from said third hydraulic cylinder means when the pressure delivered by said second hydraulic cylinder means exceeds the pressure delivered by said master cylinder to said first hydraulic cylinder means by a third multiple higher than said second multiple.

16. In a vehicle braking system having a bracket connected to said vehicle and a rotor fixed to a vehicle wheel, and a first hydraulic cylinder means located in a caliper relatively mounted to said bracket and activated by a master cylinder to restrain motion of said rotor, a second hydraulic reaction cylinder means, activated by the reaction between said caliper and said bracket when said first hydraulic cylinder means is activated, and a third hydraulic cylinder means activated by pressure delivered from said second hydraulic cylinder means to restrain said rotor, an apparatus for providing pressure from said second hydraulic cylinder means to said third hydraulic cylinder means generally at a ratio of the pressure delivered to said first hydraulic cylinder means by said master cylinder, said apparatus comprising:

means for allowing free-flow between said second hydraulic cylinder means and said third hydraulic cylinder means so long as the pressure delivered by said second hydraulic cylinder means to said third hydraulic cylinder means is lower than a first multiple of the pressure delivered by said master cylinder to said first hydraulic cylinder means;

means preventing flow from said second hydraulic cylinder means to said third hydraulic cylinder means when the pressure delivered by said second hydraulic cylinder means exceeds the pressure delivered by said master cylinder by a second multiple higher than said first multiple; and means for displacing fluid from said third hydraulic cylinder means when the pressure delivered by said second hydraulic cylinder means to said third hydraulic cylinder means exceeds the pressure delivered by said second hydraulic cylinder means to said first hydraulic cylinder means by a third multiple higher than said second multiple.

* * * * *